United States Patent
Ersoy

(10) Patent No.: US 6,694,838 B2
(45) Date of Patent: Feb. 24, 2004

(54) GEARSHIFT SELECTOR FOR A VEHICLE TRANSMISSION

(75) Inventor: Metin Ersoy, Walluf (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 0 days.

(21) Appl. No.: 10/318,807

(22) Filed: Dec. 13, 2002

(65) Prior Publication Data

US 2003/0084741 A1 May 8, 2003

Related U.S. Application Data

(63) Continuation of application No. 09/462,735, filed as application No. PCT/DE99/01419 on May 11, 1999.

(30) Foreign Application Priority Data

May 13, 1998 (DE) .......................... 198 21 403

(51) Int. Cl.$^7$ .............................................. B60K 20/00
(52) U.S. Cl. .................................. 74/473.1; 74/473.34
(58) Field of Search .................... 74/335, 473 XY, 74/473.1, 473.12, 473.3, 473.33, 473.34

(56) References Cited

U.S. PATENT DOCUMENTS

| | | | |
|---|---|---|---|
| 3,742,204 A | 6/1973 | Price | |
| 4,162,384 A | * 7/1979 | Chicoine | ............... 200/61.88 |
| 4,478,308 A | 10/1984 | Klaassen | |
| 4,912,997 A | * 4/1990 | Malcolm et al. | .............. 74/335 |
| 5,142,928 A | 9/1992 | Buti et al. | |
| 5,161,422 A | 11/1992 | Suman et al. | |
| 5,168,221 A | * 12/1992 | Houston | ............... 74/471 XY |
| 5,675,359 A | 10/1997 | Anderson | |
| 5,678,455 A | 10/1997 | Watarai | |
| 5,692,541 A | 12/1997 | Brown | |
| 5,767,840 A | 6/1998 | Selker | |
| 5,845,534 A | 12/1998 | Kim | |
| 6,032,922 A | 3/2000 | Shew | |
| 6,081,257 A | 6/2000 | Zeller | |
| 6,152,676 A | 11/2000 | Evert et al. | |
| 6,178,841 B1 | 1/2001 | Ruckert et al. | |
| 6,320,284 B1 | 11/2001 | Fontana et al. | |
| 6,328,127 B1 | 12/2001 | Hori et al. | |

FOREIGN PATENT DOCUMENTS

| | | |
|---|---|---|
| DE | 27 00 976 A1 | 7/1978 |
| DE | 40 29 330 A1 | 3/1992 |
| DE | 43 20 591 A1 | 1/1995 |
| DE | 196 32 254 C1 | 10/1997 |
| GB | 518116 | 2/1940 |
| JP | 1-282030 A | 11/1989 |
| JP | 0525755 | 10/1993 |
| JP | 6-94110 | 4/1994 |
| JP | 06094110 | 4/1994 |
| JP | 09263153 A | 10/1997 |
| WO | WO 91/06903 | 5/1991 |

* cited by examiner

*Primary Examiner*—Roger Pang
(74) *Attorney, Agent, or Firm*—McGlew and Tuttle, P.C.

(57) ABSTRACT

A shifting device for the electronic selection and/or control of the gears of a vehicle transmission is provided with a shift knob and at least one shifting mechanism. The shifting mechanism has a gear selection device. The shifting mechanism is mounted pivotably around at least one axis. A converting device converts the mechanical shifting movements into optical and/or electric and/or hydraulic signals (shift commands). A transmitting device transmits the signals. A bracket (8) is provided for the stationary positioning of the shift knob (1) in the interior of the vehicle.

20 Claims, 4 Drawing Sheets

GEARSHIFT SELECTOR FOR A VEHICLE TRANSMISSION

This is a Continuation of application Ser. No. 09/462,735 filed May 19, 2000, Which is a 371 of PCT/DE99/01419 filed May 11, 1999, and the entire disclosure of this prior application is considered to be part of the disclosure of the accompanying application and is hereby incorporated by reference therein.

FIELD OF THE INVENTION

The present invention pertains to a device for the electronic selection and control of the gears of a vehicle transmission.

BACKGROUND OF THE INVENTION

Such devices are needed to transmit the gear or automatic gear desired by the driver to the vehicle transmission in electronically controlled vehicle transmissions.

JP 6-941 10 A describes a shifting device, which has only one shift gate and makes possible both automatic operation and stepping operation for the touch-type electronic selection of individual gears. A connection between the shift knob and the selector shaft carrying same, which can be released by manual actuation, can be disengaged only in a certain shift position of the selector shaft, and the shift knob is pivotable around an axis relative to the selector shaft. A shifting mechanism for the touch-control gear selection is present in the shift knob. Furthermore, means for converting the mechanical shifting movements into electric signals as well as means for transmitting these signals are necessary in a shifting device according to JP 6-94110 A.

DE 40 29 330 A1 discloses a shifting device for a motor vehicle transmission with a selector lever, which is mounted in a universal joint, can be pivoted in a first shift gate provided in a shift housing for preselecting gears and can be switched over into a second shift gate that is parallel to the first shift gate via a transverse gate, wherein the selector lever is held in a spring-loaded locking link with a locking member in both end positions of the switch-over movement, wherein the locking link is provided in a stop lever that is mounted rotatably on one of its sides in a joint hub for the selector lever and is tensioned by a tension spring against the locking member of the selector lever on its other side. Consequently, the shifting device has, in general, a shifting mechanism with a means for gear selection and a means for converting the mechanical movement of the shift knob into a shift command.

The problem arising with these shifting devices is that an ergonomically optimal positioning of the shifting device between the seats of the vehicle or in the cockpit of the motor vehicle is possible with limitations only, especially if there are individual differences in the driver's position and the size of the driver.

SUMMARY AND OBJECTS OF THE INVENTION

The primary technical object of the present invention is to develop a shifting device that makes possible an ergonomically optimal positioning along with miniaturization.

According to the invention, a shifting device is provided for the electronic selection and/or control of the gears of a vehicle transmission. The shifting device includes a shift knob, a bracket and a shifting mechanism. The shifting mechanism has a gear selection device. The gear selection device is mounted on the shift knob pivotably around at least one axis. The shifting mechanism has a converting device for converting mechanical shifting movements into shift commands. The shift commands may be optical and/or electric and/or hydraulic signals. The shifting mechanism also has a signal transmitter. The shift knob forms or is provided at an upper end of the bracket. The bracket provides a stationary positioning of the shift knob in an interior of the vehicle.

Thus, the shifting device according to the present invention contains a shift knob, which has a shifting mechanism, for the electronic selection and/or control of the gears of a vehicle transmission. The shifting mechanism comprises a means for gear selection, which is mounted pivotably around at least one axis, and a means for converting mechanical shifting movements into electric, optical and/or hydraulic signals and a means for transmitting the electric signals. The shifting device according to the present invention also contains a bracket for the shifting mechanism, which can be optionally positioned stationary in the inside of the vehicle and which no longer can or has to be pivoted within one or more shift gates, as in prior-art shifting devices.

According to a variant of the shifting device according to the present invention, the shifting mechanism has a universal joint (cardan joint or carden type universal joint), as a result of which the means for gear selection becomes movable around two axes. In addition, a link, which brings about the guiding of the movement of the means for gear selection, may be provided according to another variant according to the present invention.

The link preferably has two parallel shift gates and a transverse gate for connecting the shift gates.

The bracket may be designed according to the present invention such that it is flexible enough to be able to be fixed in different positions. Another possibility is for the bracket to be able to be pivoted around an axis and locked, or for the bracket to be fastened to a ball joint, which is freely movable for positioning the bracket and can be fixed after positioning the bracket.

In a special embodiment, the means for converting the mechanical movement into an electric or electronic shifting command is by means of a Hall generator. Another embodiment of the means for converting the mechanical movement may be a microswitch or an optical sensor. As an alternative, it is also possible for the means for converting the mechanical movement to have a connection to a hydraulic system and to open or close hydraulic valves and/or to actuate switches with this means.

An electric wiring, optical fibers or a flexible hydraulic line or tube may also be used to transmit these signals for controlling the transmission. Wireless transmission by means of infrared light, ultrasound or microwaves is also feasible.

According to another variant of the present invention, the shift knob is made detachable from the bracket. As a result, it is possible to embody a simple version of theft protection. In an improved variant of this embodiment, a transponder each may be provided on the shift knob and/or the vehicle, which ensures that the shifting pulses can be transmitted only with coded signals matching each other and the electronic system of the vehicle. If a coding transponder is installed, it is also possible for the absence of the transponder to block driving away in the electronic system of the vehicle.

It is self-explanatory that the above-mentioned features of the present invention, which will be explained below, can be used not only in the particular combination described, but also in other combinations or alone, without going beyond the scope of the present invention.

Other features and advantages of the present invention will appear from the following description of a preferred exemplary embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
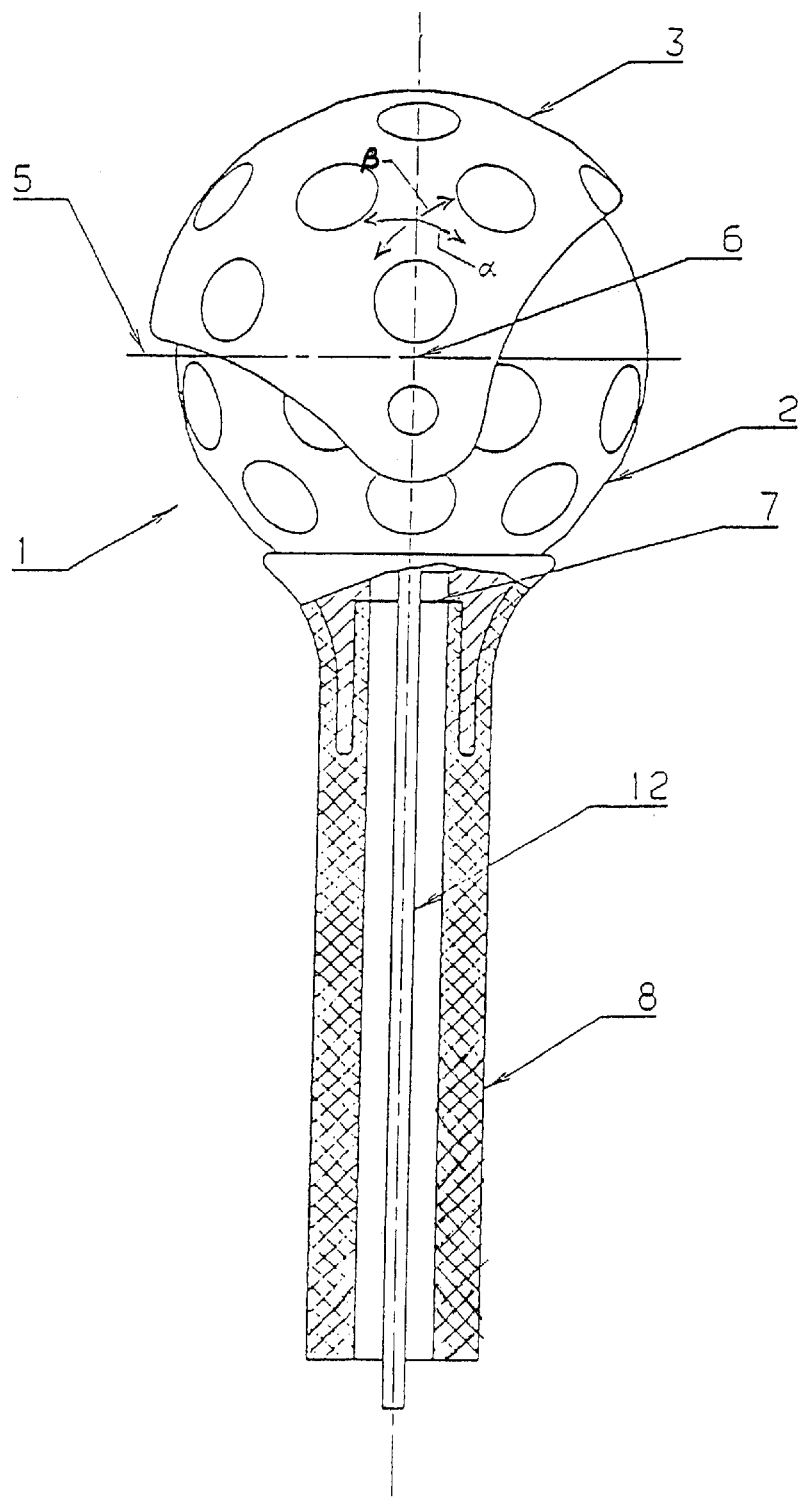
FIG. 1 is a partially sectional side view showing a shifting device with a knob on a bracket.
Figure 4:
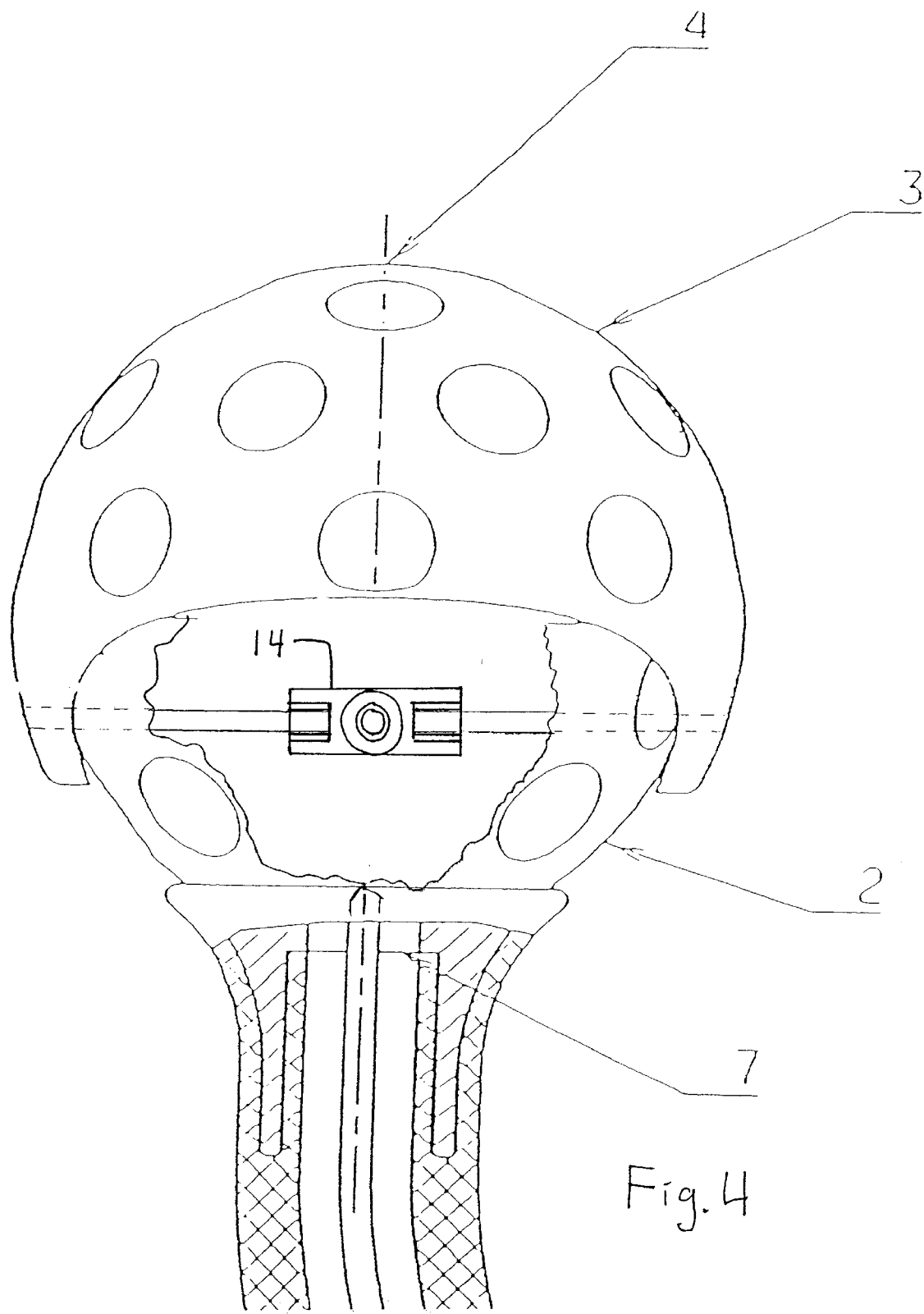
FIG. 4 is a internal cutaway view showing a generic universal joint of the shifting device.

Refering to the drawings in particular, FIG. 1 shows an embodiment of a shifting device according to the present invention for the electronic selection or control of gears of a vehicle transmission. The device has a shift knob 1, which has a shifting mechanism, wherein the gear selection device is embodied, e.g.. as Hall generators, optical sensors or even microswitches. The shift knob 1 comprises a lower part 2 and an upper part 3, wherein the lower part 2 is fixed on a bracket 8. The lower part 2 has an approximately hemispherical shape, in the center 6 of which a universal joint 14 is provided, which is shown in FIG. 4 and to which the upper part 3 of the shifting mechanism is in turn fastened. The upper part 3 can be pivoted by means of the universal joint in two planes by the angles $\alpha$ and $\beta$ about a first axis of rotation 4, and second axis of rotation 5. Pivoting of the upper part 3 about the first axis of rotation 4 in the plane of the angle $\alpha$ brings about the desired shifting operations. Pivoting of the upper part 3 about the second axis of rotation 5 in the plane of angle $\beta$ makes it possible to select a predetermined shift gate. In the embodiment shown, the upper part 3 also has the shape of a calotte shell on its outside, but it may also be designed in the manner of a "joystick" in special other embodiments, in which only the knob, but not the bracket must be moved according to the present invention to enter the shift commands.

In the variant shown in FIG. 1. the shifting device has an electric, or optical or hydraulic connection 12, with which the shifting pulses generated by the shifting mechanism can be passed on to a transmission. The shift knob 1 is removably connected to the bracket 8, so that a simple removal of the shifting mechanism offers theft protection for the vehicle. The connection between the bracket 8 and the shift knob may be preferably brought about via a bayonet catch, but it is also possible to use a special closing device, which is to be locked and unlocked with a key. In addition, it is possible to insert into the shift knob 1 a transponder, which codes the shifting pulses correspondingly and transmits them to the vehicle, and which is provided with a new code each time it is removed, so that movement of the vehicle is made possible only with exactly the same, previously removed shift knob.

In the form shown in FIG. 1, the shifting device has a rigid bracket 8. This bracket may also be designed as a telescopic bracket according to the present invention, so that the height of the shift knob remains variable. It is also possible to change the position of the shift knob by mounting the bracket 8 on a rail, so that its position in the direction of travel can be adapted corresponding to the ergonomic requirements of the seating position of the driver. It is also possible to bring about a forced connection between the positioning of the driver's seat and the position of the shift knob both in height and in the longitudinal direction.

Figure 2:
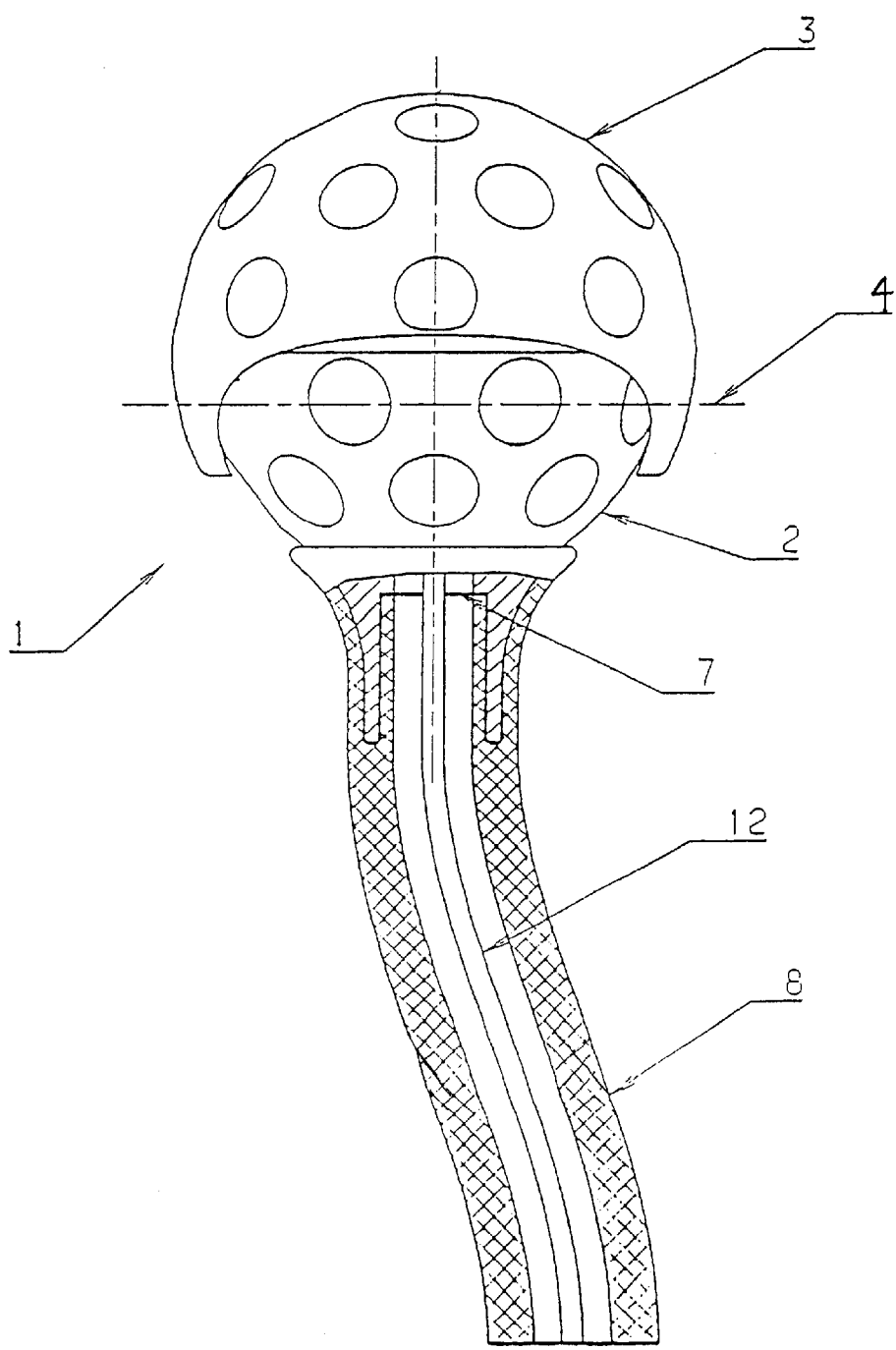
FIG. 2 is a partially sectional side view showing a shifting device with a knob on a flexible bracket.

FIG. 2 shows a shift knob 1 corresponding to FIG. 1, but a flexible design of the bracket 8 is shown.

Figure 3:
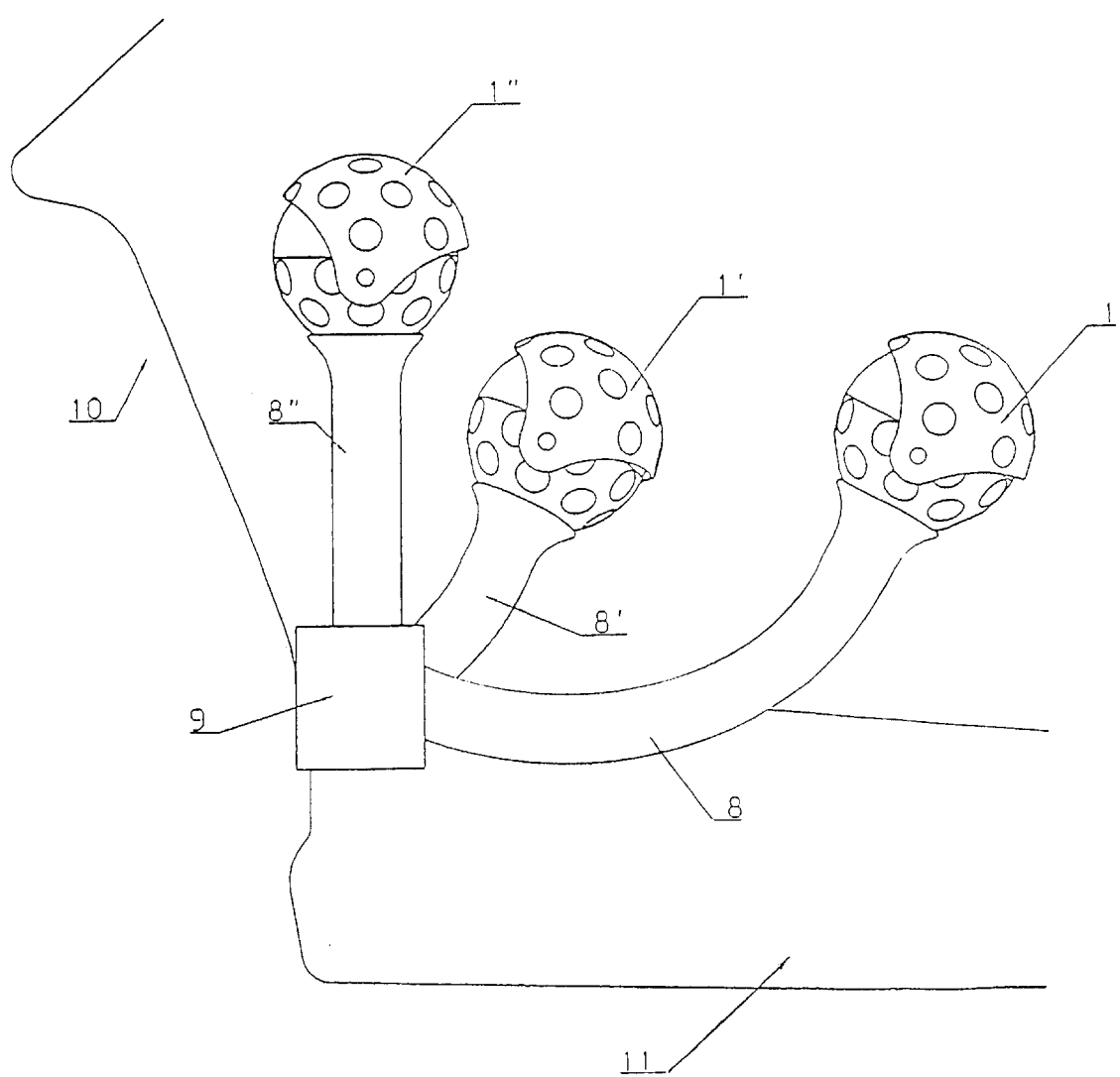
FIG. 3 is a side view showing three positions of a shifting device with a knob on a bracket with joint.

FIG. 3 likewise shows a shift knob 1, 1', 1" in three different positions on a flexible bracket 8, which is fixed on the front side of the cockpit 10. The bracket 8 may also have a joint 9 according to the present invention, so that pivoting of the bracket 8 into the different, ergonomically favorable positions is made possible, Coupling of the adjusting mechanism of the shifting device with the adjusting mechanism of the driver's seat in the longitudinal direction and with the height adjustment of the driver's seat is possible in this case as well. In addition, a combination of a telescopic arm and joint for the bracket 8 is also possible.

On the whole, the embodiments of a shifting device according to the present invention make possible a problem-free and simple adaptation of the positioning of the shifting device in the cockpit to the ergonomic requirements of different drivers.

While specific embodiments of the invention have been shown and described in detail to illustrate the application of the principles of the invention, it will be understood that the invention may be embodied otherwise without departing from such principles.

What is claimed is:

1. A shifting device for the electronic selection and or control of the gears of a vehicle transmission comprising:
    a shift knob with a lower part and an upper part, said upper part being connected to said lower part about a first axis of rotation and a second axis of rotation, said upper part being pivotable around said lower part about said first axis through an angle $\alpha$ and about said second axis through an angle $\beta$, said shift knob forming an upper end of a bracket, said bracket providing stationary positioning of said shift knob in an interior of the vehicle; and
    a means for converting pivotal motion of said upper part through said angles $\alpha$ and $\beta$ into shift commands, said shift commands being one of electrical, optical and hydraulic, said means being mounted in said shift knob.

2. A shifting device according to claim 1, wherein said upper part is connected to said lower part by a cardan type universal joint.

3. A shifting device according to claim 1, wherein said means for converting said pivotal motion of said upper part into said shift commands includes one of Hall sensors, microswitches and optical sensors.

4. A shifting device according to claim 2, wherein said means for converting said pivotal motion of said upper part into said shift commands includes one of Hall sensors, microswitches and optical sensors.

5. A shifting device according to claim 1, wherein said bracket is flexible.

6. A shifting device according to claim 4, wherein said bracket is flexible.

7. A shifting device according to claim 1, wherein said bracket can be pivoted and locked around an axis.

8. A shifting device according to claim 4, wherein said bracket can be pivoted and locked around an axis.

9. A shifting device according to claim 1, further comprising:
electrical wiring transmitting said electrical shift commands.

10. A shifting device according to claim 1, further comprising:
optical fibers transmitting said optical shift commands.

11. A shifting device according to claim 1, further comprising:
a hydraulic line transmitting said hydraulic shift commands.

12. A shifting device according to claim 1, wherein said shift commands are transmitted with one of infrared light, ultrasound and microwaves.

13. A shifting device according to claim 1, wherein said shift knob is removable from said bracket.

14. A shifting device according to claim 4, wherein said shift knob is removable from said bracket.

15. A shifting device according to claim 13, further comprising:
mutually coordinated coding transponders in said shift knob and in the vehicle, wherein transmission of shift commands is only possible with said mutually coordinated coding transponders.

16. A shifting device according to claim 14, further comprising:
mutually coordinated coding transponders in said shift knob and in the vehicle, wherein transmission of shift commands is only possible with said mutually coordinated coding transponders.

17. A shifting device according to claim 15, wherein an absence of said shift knob with said transponder prevents driving of the vehicle.

18. A shifting device according to claim 16, wherein an absence of said shift knob with said transponder prevents driving of the vehicle.

19. A shifting device for the electronic selection and or control of the gears of a vehicle transmission, the shifting device comprising:
a shift knob base part; and
a shift knob cap part, said cap part being connected to said base part about a first axis of rotation and about a second axis of rotation, said cap part partially surrounding said base part, said cap part being pivotable around said base part about said first axis through an angle α for selection of a shift command and about said second axis through an angle β for the selection of a shifting gate, said cap part having the shape of a calotte shell with a non-smooth surface, said shift knob forming an upper end of a bracket, said bracket providing stationary positioning of said shift knob in an interior of a vehicle.

20. A shifting device for a vehicle, the shifting device comprising:
a bracket extending from a portion of the vehicle;
a shift knob connected to an end of said bracket, said shift knob having a first part fixed to said bracket, said shift knob having a second part movably connected to said first part, said second part being moveable about two axes around said first part and in relation to said first part within one or more gates, said first part having a substantially hemispherical shape;
a converting device for converting mechanical movements of said second part of said shift knob relative to said first part of said shift knob into shift commands.

* * * * *